United States Patent Office 3,772,383
Patented Nov. 13, 1973

3,772,383
PROCESS FOR PREPARING PHENYL ESTERS OF ALIPHATIC CARBOXYLIC ACIDS
Naoya Kominami, Tokyo, and Nobuhiro Tamura, Saitama, Japan, assignors to Asahi Kasei Kogyo Kabushiki Kaisha, Osaka, Japan
No Drawing. Filed Aug. 6, 1971, Ser. No. 169,835
Claims priority, application Japan, Aug. 6, 1970, 45/68,344; July 16, 1971, 46/49,215
Int. Cl. C07c 69/02, 69/14, 69/22
U.S. Cl. 260—479 R                    17 Claims

ABSTRACT OF THE DISCLOSURE

Phenyl esters of aliphatic carboxylic acids which are useful as the material for preparing phenols or other derivatives, are prepared in one step and in remarkably high yield from benzene or lower alkly derivatives thereof, by reacting them with lower aliphatic carboxylic acids and a molecular oxygen-containing gas in liquid phase at an elevated temperature in the presence of nitric acid, using a catalyst of (i) palladium or its compounds, (ii) at least one of the compounds of copper, zinc, cadmium, uranium, tin, lead, vanadium, antimony, bismuth, chromium, tellurium, manganese, iron, cobalt, nickel or thallium, and (iii) an alkali salt of fatty acid.

---

This invention relates to a process for preparing phenyl esters of aliphatic carboxylic acids. Particularly, this invention relates to a commercially feasible one-step process for preparing the above compounds.

Phenyl esters of aliphatic carboxylic acids are readily hydrolyzed to obtain phenols or pyrolyzed to obtain phenols and ketenes. The phenyl esters, which are stable to oxidation, are also useful for the synthesis of secondary or ternary derivatives thereof. For example, acetoxy benzoic acid can be derived from cresyl acetate.

British Pat. No. 1,178,779 discloses a process for preparing phenyl acetate from benzene, acetic acid and molecular oxygen in gas phase using palladium compounds. British Pat. Nos. 1,200,392 and 1,200,708 reveal a process for preparing phenyl acetate from benzene, acetic acid and molecular oxygen either in gas or liquid phase, in the presence of palladium or a compound thereof together with a compound of IIb, III, IV, V or VI Group of the Periodic Table. Japanese patent publication No. 21,809/70 shows a process for preparing phenyl esters of aliphatic carboxylic acids by reacting under reflux metallic palladium or compounds thereof, aromatic hydrocarbons, aliphatic carboxylic acids and nitric acid.

The former three patents relate only to the use of benzene as one of the starting materials. If toluene were used in place of the benzene in these processes, however, benzyl ester would be formed as in Japanese patent publication No. 29,046/69. The processes in the British patents are not applicable for preparing a variety of phenyl esters, because there occurs no direct esterification at the benzene nucleus of branched aromatics. Furthermore, these three processes are inferior in that, when they are effected in gas phase, catalyst activity is lower and decreases rapidly in a short period of time. Even when the processes of the above British patents are effected in liquid phase, yields of phenyl esters of carboxylic acid no not exceed 100% per palladium charged, as in the examples of British Pat. No. 1,200,708. This means that palladium does not behave as a catalyst.

Japanese patent publication 21,809/70 has many difficulties that recycling of the catalyst is not easy, a large amount of nitrobenzenes is produced and selectivity of phenyl carboxylate is extremely low. Furthermore, the process has to use a very expensive precious metal, and is by no means commercial taking into consideration loss of the metal during recycle-regeneration step and others.

The present inventors proposed the preparation of phenyl esters from benzene or lower alkyl derivatives thereof, aliphatic carboxylic acids and molecular oxygen in the presence of nitric acid, using as a catalyst palladium or a compound thereof together with or without an alkali salt of fatty acid (U.S. Ser. No. 42,903 filed on June 2, 1970.).

According to the proposed process, phenyl esters of carboxylic acid are obtained in very high selectivity (i.e., by-production of nitro benzenes is very small). In addition, the palladium behaves as a catalyst and the yield of the phenyl esters well exceeds 100% when the process is effected in liquid phase, and high catalyst activity with small deactivation is attained when it is effected in gas phase. The above process, however, is not yet satisfactory with respect to the yield based on palladium. An attempt to increase the yield based on palladium, however, brings about decrease of the yield of the product based on aromatics.

The present inventors made extensive studies on promoters in order to increase the yield based on palladium as well as that based on aromatics. The present inventors have found that addition of at least one of the compounds of copper, zinc, cadmium, uranium, tin, lead, vanadium, antimony, bismuth, chromium, tellurium, manganese, iron, cobalt nickel or thallium, together with alkali salt of fatty acid to a catalyst of palladium or a compound thereof is very helpful when the above proposed process is effected in liquid phase.

According to the present invention, a process for preparing phenyl esters of aliphatic carboxylic acid is provided which comprises reacting aromatic hydrocarbons with aliphatic carboxylic acids and molecular oxygen-containing gas in liquid phase at an elevated temperature in the presence of nitric acid, using a catalyst of (i) palladium or its compounds, (ii) at least one of the compounds of copper, zinc, cadmium, uranium, tin, lead, vanadium, antimony, bismuth, chromium, tellurium, manganese, iron, cobalt, nickel or thallium and (iii) an alkali salt of fatty acid.

The present invention proceeds in the following reaction scheme:

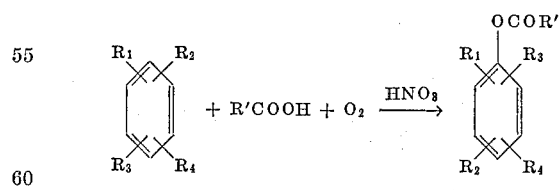

wherein $R_1$ represents a hydrogen atom, or a lower alkyl group; $R_2$, $R_3$ and $R_4$ are a hydrogen atom or a methyl group, respectively; and $R'$ stands for a $C_1$–$C_5$ alkyl group.

Aromatic hydrocarbons used as a starting material in the present invention are those of the general formula:

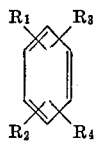

wherein $R_1$ represents a hydrogen atom or a $C_1$–$C_4$ alkyl group such as methyl, ethyl, n-propyl, iso-propyl, n-butyl or iso-butyl group; and $R_2$, $R_3$ and $R_4$ are a hydrogen atom or a methyl group, respectively. Examples are benzene, toluene, xylene, ethylbenzene, cumene, t-butyl benzene, pseudo cumene, mesitylene, durene, etc.

The present aliphatic carboxylic acids are those of the general formula, R'COOH, wherein R' is a lower alkyl group, preferably $C_1$–$C_5$ alkyl group. They include acetic acid, propionic acid, n-butyric acid, iso-butyric acid, caproic acid, etc.

As molecular oxygen-containing gas, either oxygen or air is commercially used.

The present catalyst consists of three components. The first component is metallic palladium or palladium compounds. The palladium compounds as can be used herein include carboxylates such as acetate, propionate, isobutyrate, etc.; coordinated compounds such as acetyl acetonate, etc.; inorganic acid salts such as nitrate, phosphate, etc.; hydroxides and oxides.

The second component includes compounds of copper, zinc, cadmium, uranium, tin, lead, vanadium, antimony, bismuth, chromium, tellurium, manganese, iron, cobalt, nickel or thallium. Examples are carboxylates such as acetates, propionates, iso-butyrate, etc.; coordinated compounds such as acetyl acetonates, etc.; hydroxyacetates, nitrates and oxides. The amount of the second component to be added is in the range of 30–1/10, preferably 20–1/5 in terms of the second component atom/palladium atom.

The third component, an alkali salt of fatty acid, used herein includes formates, acetates, propionates and iso-butyrates of lithium, sodium, potassium, rubidium and cesium. The amount of said alkali salt of fatty acid to be added is in the range of 30–1/10 in terms of alkali metal atom/palladium atom.

The catalyst may be carried on carriers. The carriers may be any of those conventionally employed in a catalytic reaction. They include activated carbon, silica, alumina and the like. In case metallic palladium is employed, it can be prepared, for example, by calcining nitrate of copper and the like carried on a carrier to deposit copper oxides, impregnating the palladium salt, reducing with a reducing agent such as hydrogen, hydrazine or the like, and finally supporting an alkali salt of fatty acid. Preparation of the catalyst is not critical. Any of conventionally known preparations can be employed.

Nitric acid plays an important role in the present invention. Alternatively, other compounds such as nitrous acid, nitrogen monoxide and nitrogen dioxide can be used in place of the nitric acid.

The present process is effected in liquid phase. The concentration ratio of aromatic hydrocarbons to aliphatic carboxylic acids is not critical. The preferable ratio is in the range of 1/30–5 (in volume) in terms of aromatic hydrocarbon/aliphatic carboxylic acid.

Nitric acid is used in the range of 0.2–0.001 mol, more preferably 0.05–0.002 mol, based on 1 mol of aliphatic carboxylic acids. If it is used in excess exceeding the above range, by-production of nitro compounds is increased, while in a less amount, reaction activity is lowered. Nitrogen monoxide, for example, may be charged separately or together with the below mentioned molecular oxygen-containing gas.

The present reaction is effected according to any one of methods such as a flow method, a liquid-gas mixing and agitating method, liquid phase gas blowing method and the like.

The present process is conducted at a temperature between 50–250° C., preferably 70–210° C., and is practiced either under normal pressure or under pressure. The reaction is preferably carried out under pressure, especially at a pressure between 2–100 kg./cm.² absolute, in order to keep the reaction system in liquid phase and to get higher activity. Inert gas such as nitrogen and argon, may be present in the reaction system.

The principal products according to the present invention, when the aliphatic carboxylic acid is acetic acid, are phenyl acetate from benzene; o-, m- and p-tolyl acetates from toluene; 3,4-dimethyl phenyl acetate from o-xylene; 2,4-dimethyl phenyl acetate from m-xylene; 2,5-dimethyl phenyl acetate from p-xylene; o-, m-, and p-ethyl phenyl acetates from ethyl benzene; m- and p-isopropyl phenyl acetates from cumene; m- and p-t-butyl phenyl acetates from t-butyl benzene; 2,4,5-trimethyl phenyl acetate from pseudocumene; 2,4,6-trimethyl phenyl acetate from mesitylene; and 2,3,5,6-tetramethyl phenyl acetate from durene. Obviously, if other aliphatic carboxylic acids than acetic acid are used, corresponding phenyl esters thereof are obtained.

The present invention is further illustrated by, but not limited to, the following examples.

EXAMPLE 1

0.4 g. of bismuth (III) nitrate was carried on 10 cc. of silica gel and calcined at 500° C. for 4 hours. Then it was immersed in a dilute aqueous hydrochloric acid solution dissolving 0.034 g. of palladium chloride, evaporated to dryness, reduced by adding alkaline hydrazine hydrate, washed thoroughly by water, and finally dried to obtain a catalyst..

Into a 50 cc. micro-bomb made of chromium steel (SUS–32) were charged 5 cc. of the above obtained catalyst, 2 cc. of benzene, 18 cc. of acetic acid, 0.1 g. of potassium acetate and 0.2 cc. of commercially available concentrated nitric acid. The micro-bomb was sealed and then oxygen gas was introduced until 20 kg./cm.² through the upper valve. Subsequently, the micro-bomb was mounted on a shaking apparatus of an oil bath kept at a temperature of 120° C. to effect a reaction for 2 hours. The reaction mixture was assayed. As a result, the yield of phenyl acetate was 14 mol percent based on benezne (3160 mol percent based on palladium). The yield of nitrobenzene by-produced was 1.2% based on benzene.

For comparison, the above example was repeated except that the catalyst was changed to 5 cc. of a palladium-silica gel catalyst with no bismuth. After a reaction for 2 hours, the yield of phenyl acetate was 3.2% based on benzene (720% based on palladium) and the yield of nitrobenzene was 0.25% based on benzene.

Similarly, the above example was conducted in the same way but in the absence of nitric acid. The yields after 2 hours and after 20 hours were 0.06% based on benzene (13.6% based on palladium) and 0.13% based on benzene (29.4% based on palladium), respectively. The result shows that the palladium does not work as a catalyst.

Furthermore, in the above example, nitrogen was used in place of oxygene. After 2 hours, the yield of phenyl acetate was 0.57% based on benzene (129% based on palladium) and the yield nitrobenzene by-produced was 0.74% based on benzene.

EXAMPLE 2

In the same micro-bomb (SUS–32) used in Example 1, were charged 0.023 g. of palladium nitrate, 0.05 g. of thallium (II) acetate, 0.02 g. of lithium acetate, 2 cc. of toluene, 18 cc. of iso-butyric acid and 0.1 cc. of commercially available concentrated nitric acid. Air was introduced until 50 kg./cm.² from the upper valve. After the bomb was shaken at 150° C. for 3 hours, o-, m- and p-methyl phenyl isobutyrates were obtained in 2.4%, 3.2% and 3.7% yields, respectively based on toluene. (Total yield of o-, m- and p-methyl phenyl isobutyrates based on palladium was 1800%.) Byproducts of m- and p-nitrotoluenes were formed in 0.2% and 0.4% yields, respectively.

EXAMPLE 3

Manganese (II) nitrate (0.3 g.) carried on 10 cc. of silica gel and calcinated at 500° C. for 6 hours was immersed in a dilute aqueous hydrochloric acid solution dissolving 0.017 g. of palladium chloride, evaporated to dryness, reduced by adding alkaline hydrazine hydrate, washed thoroughly with water and dried. Further, 0.1 g. of potassium acetate was incorporated to the resultant by an immersing method to obtain the catalyst.

Into the same micro-bomb used in Example 1, were charged 5 cc. of the above prepared catalyst, 10 cc. of benzene, 10 cc. of acetic acid and 0.5 cc. of commercially available nitric acid. Then oxygen gas was introduced until 40 kg./cm.² through the upper valve. The micro-bomb was mounted on a shaking apparatus of an oil bath kept at 100° C. for 16 hours. After the reaction, the reaction mixture was assayed to show that phenyl acetate was formed in 3.9% yield based on benzene (8800% yield based on palladium). Nitrobenzene was by-produced in a 0.4% yield based on benzene.

For comparison, Example 1 was repeated except that the catalyst was palladium-potassium acetate-silica without manganese. Reaction was effected in the same condition as in Example 1 for 16 hours to give 0.9% of phenyl acetate based on benzene (2030% based on palladium) and 0.2% of nitrobenzene based on benzene.

EXAMPLES 4–22

Results for each of different catalysts employing the same apparatus and the same reaction condition as in Example 1, were summarized in Table 1. In the table, the catalyst with a mark * was prepared as in Example 1 by carrying the second component on the carrier, calcined at 500° C. for 4 hours before the first (palladium) and the third (alkali salts of fatty acids) components were incorporated. The yields of products were expressed in mol percent of phenyl esters of carboxylic acids based on aromatic hydrocarbons charged and based on palladium, respectively. Selectivity is expressed in mol percent of phenyl esters of carboxylic acids based on converted aromatic hydrocarbon.

TABLE 1

| Ex. No. | Catalyst (amount used) | | Reaction conditions— Composition of starting materials | | | | | Reaction time (hr.) | Reaction results Yield | | Selectivity (mol percent) |
|---|---|---|---|---|---|---|---|---|---|---|---|
| | | | Aromatic hydrocarbon (cc.) | Aliphatic carboxylic acid (cc.) | Nitric acid (cc.) | Oxygen (kg./cm.²) | Reaction temperature (°C.) | | Based on aromatic hydrocarbon (mol percent) | Based on palladium (mol percent) | |
| 4 | Palladium (0.02 g.) | Copper (II) acetate (0.1 g.) | Cesium acetate (0.5 g.) | Silica (10 cc.) | Toluene, 5 | Acetic acid, 15 | 1.0 | 50 | 120 | 5 | o-Tolyl acetate, 1.7; m-Tolyl acetate 4.2, p-Tolyl acetate, 4.4. | 2,500 | 81 |
| 5 | *Palladium (0.03 g.) | Potassium acetate (0.5 g.) | Vanadium (V) oxide (0.2 g.) | Alumina (10 cc.) | m-Xylene, 10 | Acetic acid, 10 | 1.0 | 50 | 150 | 16 | 2,4-dimethylphenyl acetate, 2.8 | 3,300 | 77 |
| 6 | *Palladium acetate (0.045 g.) | Sodium acetate (0.2 g.) | Chromium (III) oxide (0.1 g.) | Silica (10 cc.) | Benzene, 2 | Acetic acid, 16 | 0.5 | 50 | 150 | 2 | Phenyl acetate, 9.3 | 1,040 | 87 |
| 7 | Palladium nitrate (0.05 g.) | Manganese (II) nitrate (0.1 g.) | Rubidium acetate (0.2 g.) | Activated carbon (5 cc.) | Benzene, 5 | Acetic acid, 10 | 1.0 | 40 | 130 | 12 | Phenyl acetate, 8.4 | 2,160 | 89 |
| 8 | *Palladium (0.02 g.) | Cesium formate (0.2 g.) | Iron (III) oxide (0.2 g.) | Alumina (10 cc.) | Cumene, 5 | Acetic acid, 15 | 0.2 | 70 | 100 | 12 | m-iso-Propyl phenyl acetate, 3.1; p-iso-Propyl phenyl acetate, 2.2. | 1,130 | 92 |
| 9 | Palladium acetate (0.023 g.) | Lithium acetate (0.1 g.) | Nickel (II) oxide (0.1 g.) | | p-Xylene, 3 | Acetic acid, 20 | 0.5 | 20 | 120 | 15 | 2,5-dimethylphenyl acetate, 4.4 | 1,070 | 86 |
| 10 | Palladium (0.02 g.) | Sodium propionate (0.1 g.) | Manganese (II) acetate (0.1 g.) | | o-Xylene, 10 | Acetic acid, 5 | 0.2 | 40 | 120 | 2 | 3,4-dimethylphenyl acetate, 2.0 | 830 | 93 |
| 11 | Palladium nitrate (0.023 g.) | Potassium acetate (0.1 g.) | Copper (II) oxide (0.086 g.) | | t-Butylbenzene, 5 | Acetic acid, 10 | 0.2 | 50 | 110 | 25 | m-t-Butylphenyl acetate, 2.1; p-t-Butyl phenyl acetate, 2.8. | 820 | 81 |
| 12 | Palladium nitrate (0.046 g.) | Cobalt (II) nitrate (0.02 g.) | Rubidium acetate (0.03 g.) | | Ethylbenzene, 5 | Acetic acid, 5 | 0.3 | 50 | 150 | 5 | o-Ethylphenyl acetate, 2.7; m-Ethyl phenyl acetate, 3.8; p-Ethylphenyl acetate, 3.0. | 1,960 | 88 |

TABLE 1—Continued

| Ex. No. | Reaction conditions — Composition of starting materials | | | Catalyst (amount used) | Nitric acid (cc.) | Oxygen (kg./cm.²) | Reaction temperature (°C.) | Reaction time (hr.) | Reaction results — Yield | | Selectivity (mol percent) |
|---|---|---|---|---|---|---|---|---|---|---|---|
| | Aromatic hydrocarbon (cc.) | Aliphatic carboxylic acid (cc.) | | | | | | | Based on aromatic hydrocarbon (mol percent) | Based on palladium (mol percent) | |
| 13 | o-Xylene, 5 | Acetic acid, 15 | Palladium acetate (0.023 g.). | Uranium (II) acetate (0.05 g.). Cesium acetate (0.1 g.). | 0.2 | 40 | 120 | 3 | 3,4-dimethylphenyl acetate, 4.2. | 1,780 | 82 |
| 14 | Cumene, 2 | Acetic acid, 18 | Palladium oxide (0.022 g.). | Lead (II) acetate (0.065 g.). Lithium acetate (0.2 g.). | 0.1 | 20 | 140 | 7 | m-iso-Propylphenyl acetate, 5.1; p-iso-Propylphenyl acetate, 3.9. | 650 | 95 |
| 15 | m-Xylene, 3 | Acetic acid, 12 | Palladium acetate (0.045 g.). | Cadmium (II) acetate (0.03 g.). Lithium acetate (0.2 g.). | 0.5 | 50 | 100 | 2 | 2,4-dimethylphenyl acetate, 4.0. | 495 | 87 |
| 16 | p-Xylene, 3 | Acetic acid, 12 | Palladium acetate (0.023 g.). | Tellurium (II) oxide (0.02 g.). Sodium acetate (0.02 g.). | 0.2 | 50 | 130 | 3 | 2,5-dimethylphenyl acetate, 5.2. | 1,270 | 90 |
| 17 | t-Butylbenzene, 5 | Acetic acid, 15 | Palladium acetate (0.045 g.). | Potassium acetate (0.025 g.). Bismuth (III) nitrate (0.02 g.). | 0.3 | 40 | 170 | 24 | m-t-Butylphenyl acetate, 4.8; p-t-Butylphenyl acetate, 5.1. | 1,650 | 93 |
| 18 | Benzene, 5 | Butyric acid, 10 | *Palladium (0.01 g.). | Sodium formate (0.03 g.). Zinc (II) oxide (0.05 g.). | 0.3 | 40 | 150 | 10 | Phenyl butyrate, 5.8. | 3,220 | 90 |
| 19 | Benzene, 2 | iso-Butyric acid, 8 | Palladium nitrate (0.023 g.). | Sodium iso-butyrate (0.03 g.). Lead (II) iso-butyrate (0.02 g.). | 0.1 | 40 | 150 | 3 | Phenyl isobutyrate, 12.1. | 2,700 | 94/93 |
| 20 | Benzene, 10 | Propionic acid, 10 | *Palladium (0.01 g.). | Lithium formate (0.03 g.). Antimony (III) oxide (0.03 g.). | 0.2 | 60 | 150 | 15 | Phenyl propionate, 2.4. | 3,220 | 88 |
| 21 | Benzene, 2 | Propionic acid, 18 | Palladium nitrate (0.023 g.). | Thallium (II) acetate (0.05 g.). Potassium propionate (0.1 g.). | 0.1 | 20 | 120 | 10 | Phenyl propionate, 9.0. | 2,400 | 96 |
| 22 | do | Acetic acid, 18 | Palladium acetate (0.023 g.). | Iron (III) hydroxy acetate (0.05 g.). Potassium acetate (0.15 g.). | 0.2 | 5 | 180 | 1 | Phenyl acetate, 6.9. | 1,850 | |

EXAMPLE 23

Into a 50 cc. micro-bomb were charged 10 cc. of benzene, 10 cc. of acetic acid and 0.2 cc. of commercially available nitric acid. Further 0.1 g. of palladium acetate, 0.2 g. of manganese (II) acetate and 0.2 g. of lithium acetate were added as a catalyst and oxygen gas was introduced until 40 kg./cm.² from the upper valve after the micro-bomb was sealed. Subsequently the bomb was put in a shaking apparatus of an oil bath kept at 100° C. for 16 hours. The reaction mixture was assayed to find that phenyl acetate and nitrobenzene were formed in yields of 3.0% and 0.05%, respectively, both based on benzene fed.

EXAMPLE 24

Into a 100 cc. autoclave (made of SUS-32) with a stirrer wherein flow is adjusted from the bottom to the top kept at 120° C. were introduced a mixture of toluene, acetic acid, commercially available concentrated nitric acid, palladium acetate, cadmium (II) nitrate and potassium acetate (the amounts in a 1 l. solution being 100 cc., 890 cc., 10 cc., 1.2 g., 1.0 g, and 0.2 g., respectively) at a velocity of 30 cc./hr. Oxygen gas was introduced at a rate of 100 cc./min. until 20 kg./cm.² from the top of the autoclave to initiate a reaction. A reaction mixture was trapped and the yield after 5 hours were 2.7% for o-tolyl acetate, 3.1% for m-tolyl acetate and 3.6% for p-tolyl acetate (each based on toluene). Nitrotoluene and benzaldehyde were formed in 0.2% and 0.1% based on toluene, respectively. Selectivity was 96%. The yield of tolyl acetates was 1570% based on palladium. The yield was substantially the same, even after 24 hours.

EXAMPLE 25

Reactions were conducted employing the catalyst and the conditions in Table 2, using the apparatus and the method disclosed in Example 1. For comparison, the results of British Pat. No. 1,200,708, U.S. Ser. No. 42,903 and Japanese patent publication 21,809/70 are shown in Tables 2–4.

TABLE 2

| Process | Catalyst | Starting materials | Reaction conditions—Reaction temperature (° C.) | Reaction time (hrs.) | Reaction results—Yield (mol percent) Based on benzene Phenyl acetate | Nitro benzene | Based on palladium | Selectivity (mol percent) |
|---|---|---|---|---|---|---|---|---|
| The present invention. | Pd(OAc)₂ (0.1 mmol), TeO (0.5 mmol), KOAc (0.2 mmol). | /AcOH/HNO₃/O₂ (2 cc.) (18 cc.) (0.2 cc.) (20 kg./cm.² abs.). | 120 | 2 | 16.2 | 2.1 | 3,640 | 88 |
| | Pd(0.1 mmol), (Mn-SiO₂) (0.2 mmol), NaOAc (0.2 mmol). | Same as above | 120 | 2 | 18.3 | 3.0 | 4,130 | 86 |
| | PdNO₃(0.1 mmol), CdNO₃ (0.4 mmol), LiOAc (0.5 mmol). | do | 120 | 2 | 16.5 | 2.2 | 3,700 | 88 |
| U.S. Ser. No. 42,903. | Pd(OAc)₂(0.1 mmol) | do | 120 | 2 | 5.6 | 0.6 | 1,270 | 91 |
| British Patent No. 1,200,708. | Pd-(1.0 mmol), Te (1.0 mol); SiO₂(5 cc.) | /AcOH/O₂ (2 cc.) (18 cc.) (20 kg./cm.² abs.). | 120 | 2 | 1.2 | | 27 | >98 |

NOTE.—All reactions were conducted in liquid phase.

TABLE 3

| Process | Catalyst | Starting materials | Reaction conditions—Reaction temperature (° C.) | Reaction time (hrs.) | Reaction results—Yield (mol percent) Based on benzene Penyl acetate | Nitro benzene | Based on palladium | Selectivity (mol percent) |
|---|---|---|---|---|---|---|---|---|
| British Patent No. 1,200,708. | Pb(1.0 mmol); SiO₂ (5 cc.). | /AcOH/O₂ᵃ (2 cc.) (18 cc.) (20 kg./cm.² abs.). | 120 | 30 | 0.03 | | 0.7 | >97 |
| Japanese Patent publication No. 21,809/70. | Pd(OAc)₂ (1.0 mmol) | /AcOH/HNO₃/N₂ᵃ (2 cc.) (18 cc.) (0.2 cc.) (20 kg./cm.² abs.). | 120 | 5 | 4.5 | 5.9 | 100 | 43 |
| | Pd(OAc)₂ (1.0 mmol) | /AcOH/HNO₃/O₂ᵇ (20 cc.) (20 cc.) (0.2 cc.) (None). | 90 | 15 | 0.22 | 0.14 | 43 | 68 |
| U.S. Ser. No. 42,903. | Pd(1.0 mmol); SiO₂ (5 cc.). | /AcOH/HNO₃/O₂ᵃ (2 cc.) (18 cc.) (0.2 cc.) (20 kg./cm.² abs.). | 120 | 5 | 16.1 | 1.7 | 360 | 90 |
| | Pd(OAc)₂ (1.0 mmol) | /AcOH/HNO₃/O₂ᵃ (2 cc.) (18 cc.) (0.2 cc.) (20 kg./cm.² abs.). | 120 | 5 | 15.2 | 2.1 | 340 | 88 |
| | Pd(OAc)₂ (1.0 mmol) | /AcOH/HNO₃/O₃ᵇ (20 cc.) (20 cc.) (0.2 cc.) (15 cc./min. by blowing). | 90 | 15 | 0.53 | Trace | 115 | >97 |

ᵃ In autoclave under pressure.    ᵇ Under reflux at normal pressure.    NOTE.—All reactions shown above were conducted in liquid phase.

Table 2 clearly shows that the present process is superior to other processes. The following can be seen from Table 3 where the reaction is conducted in liquid phase, that (i) British patent forms phenyl acetate in a yield below 100% based on palladium and shows that palladium does not behave as a catalyst; (ii) Japanese patent publication 21,809/70 gives the yield up to 100% based on palladium (no increase was seen in yield even after a prolonged reaction time) and selectivity is only 40–60%; and (iii) indicates that palladium behaves as a catalyst and selectivity is fairly improved.

What is claimed is:

1. A process for preparing phenyl esters which comprises reacting benzene or lower alkyl derivatives thereof with acetic acid and a molecular oxygen-containing gas in the liquid phase at an elevated temperature in the presence of nitric acid, and a catalyst of (i) a first component of palladium or palladium salts, (ii) a second component of at least one of the oxides, nitrates and acetates of copper, manganese, chromium, nickel, cobalt, iron or vanadium, and (iii) a third component of an alkali salt of a fatty acid.

2. A process for preparing phenyl esters of aliphatic carboxylic acids, by reacting aromatic hydro-carbons, aliphatic carboxylic acids and a molecular oxygen-containing gas, which comprises conducting the reaction in the liquid phase in the presence of nitric acid, nitrous acid, nitrogen monoxide or nitrogen dioxide, and a catalyst of palladium or palladium compounds, at least one of the compounds of cadmium, zinc, uranium, tin, lead, antimony, bismuth, tellurium or thallium and an alkali salt of fatty acid.

3. A process for preparing phenyl esters of aliphatic carboxylic acids having the formula:

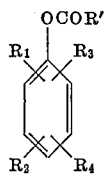

wherein $R_1$ represents a hydrogen atom or $C_1$–$C_4$ alkyl group, $R_2$, $R_3$ and $R_4$ are a hydrogen atom or a methyl group, which comprises reacting an aromatic hydrocarbon having the formula:

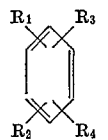

wherein $R_1$, $R_2$, $R_3$ and $R_4$ are as defined, with an aliphatic carboxylic acid having the formula: R'COOH wherein R' stands for a $C_1$–$C_5$ alkyl group, and a molecular oxygen containing gas in the liquid phase at an elevated temperature in the presence of nitric acid, and a catalyst of (i) palladium or palladium compounds, (ii) at least one of the compounds of copper, zinc, cadmium, uranium, tin, lead, vanadium, antimony, bismuth, chromium, tellurium, manganese, iron, cobalt, nickel or thallium, and (iii) an alkali salt of a fatty acid.

4. The process of claim 3, wherein the molecular oxygen containing gas is air or oxygen.

5. The process of claim 3, wherein the aromatic hydrocarbon is selected from the group consisting of toluene, xylene, ethylbenzene, cumene, t-butyl benzene, pseudo cumene, mesitylene and durene.

6. A process for preparing phenyl esters of aliphatic carboxylic acids having the formula:

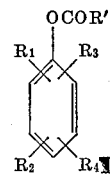

wherein $R_1$ represents a hydrogen atom or $C_1$–$C_4$ alkyl group, $R_2$, $R_3$ and $R_4$ are a hydrogen atom or a methyl group, which comprises reacting an aromatic hydrocarbon having the formula:

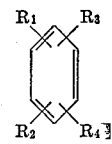

wherein $R_1$, $R_2$ and $R_4$ are as defined, with an aliphatic carboxylic acid having the formula: R'COOH wherein R' stands for a $C_1$–$C_5$ alkyl group, in a ratio of from 1/30 to 5 in volume of aromatic hydrocarbon to carboxylic acid, and a molecular oxygen containing gas in the liquid phase under a pressure of from 2 to 100 kg./cm.$^2$, at an elevated temperature of from 50 to 230° C., in the presence of from 0.02 to 0.001 mol of nitric acid per mol of aliphatic carboxylic acid, and in the presence of a catalytic amount of a three component catalyst of (i) palladium or palladium compounds, (ii) at least one of copper, zinc, cadmium, uranium, tin, lead, vanadium, antimony, bismuth, chromium, tellurium, manganese, iron, cobalt, nickel or thallium, and (iii) an alkali salt of a fatty acid, wherein the second component (ii) is present in an amount of from 30 to 1/10 in terms of the second component (ii) atom/Pd atom, and the third component (iii) being present in an amount of from 30–1/10 in terms of alkali metal atom/Pd atom.

7. A process according to claim 3, wherein the aromatic hydrocarbon is benzene, toluene, xylene, ethylbenzene, cumene, t-butyl-benzene, pseudo cumene, mesitylene or durene.

8. A process according to claim 3, wherein the aliphatic carboxylic acid is acetic acid, propionic acid, n-butyric acid, iso-butyric acid or caproic acid.

9. A process according to claim 3, wherein the palladium compound is the acetate, propionate, n-butyrate, iso-butyrate, nitrate, phosphate, oxide, hydroxide or acetyl acetonate.

10. A process according to claim 3, wherein the compound of copper, zinc, cadmium, uranium, tin, lead, vanadium, antimony, bismuth, chromium, tellurium, manganese, iron, cobalt, nickel or thallium is the acetate, propionate, n-butyrate, iso-butyrate, hydroxy acetate, nitrate, oxide or acetyl acetonate thereof.

11. A process according to claim 3, wherein the alkali salt of the fatty acid is the formate, acetate, propionate, n-butyrate or iso-butyrate of lithium, sodium, potassium, rubidium or cesium.

12. A process according to claim 3, wherein the ratios of the second component (ii) atom/palladium atom and alkali atom/palladium atom are in the ranges of 30–1/10 and 30–1/10, respectively.

13. A process according to claim 12, wherein the ratios are 20–1/5 for the former.

14. A process according to claim 3, wherein the ratio of aromatic hydrocarbon to aliphatic carboxylic acid is in the range of 1/30–5 in volume.

15. A process according to claim 3, wherein the amount of nitric acid used is in the range of 0.2–0.001 mol, based on 1 mol of aliphatic carboxylic acid.

16. A process according to claim 3, wherein a reaction is effected at a temperature of 50–250° C.

17. A process according to claim 3, wherein a reaction is effected under a pressure of 2–100 kg./cm.$^2$ abs.

References Cited

UNITED STATES PATENTS

| | | | |
|---|---|---|---|
| 3,542,852 | 11/1970 | Selwitz | 260—479 |
| 3,651,101 | 3/1972 | Boldt et al. | 260—479 |
| 3,642,873 | 2/1972 | Hornig et al. | 260—479 |
| 3,644,486 | 2/1972 | Boldt et al. | 260—479 |
| 3,646,111 | 2/1972 | Hornig et al. | 260—479 |
| 3,651,127 | 3/1972 | Hornig et al. | 260—479 |

OTHER REFERENCES

Ichikawa et al.: J. Chem. Soc. Japan—Pure Chem. Sect., vol. 90 (Feb. 10, 1969), pp. 212–218.

JAMES A. PATTEN, Primary Examiner

U.S. Cl. X.R.

252—431; 260—488 CD, 645